United States Patent
Kishimoto

(10) Patent No.: US 11,469,406 B2
(45) Date of Patent: Oct. 11, 2022

(54) MANUFACTURING METHOD OF COMPRESSED STRIP-SHAPED ELECTRODE PLATE

(71) Applicant: TOYOTA JIDOSHA KABUSHIKI KAISHA, Toyota (JP)

(72) Inventor: Tetsuro Kishimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/192,080

(22) Filed: Mar. 4, 2021

(65) Prior Publication Data

US 2021/0336242 A1 Oct. 28, 2021

(30) Foreign Application Priority Data

Apr. 24, 2020 (JP) ............................. JP2020-077409

(51) Int. Cl.
  *H01M 4/04* (2006.01)
  *B05D 3/12* (2006.01)
  *H01M 4/88* (2006.01)
  *B05D 1/40* (2006.01)
  *B05D 5/12* (2006.01)

(52) U.S. Cl.
  CPC ............. *H01M 4/0435* (2013.01); *B05D 1/40* (2013.01); *B05D 3/12* (2013.01); *B05D 5/12* (2013.01); *H01M 4/8896* (2013.01)

(58) Field of Classification Search
  USPC .................................................. 427/115, 365
  See application file for complete search history.

(56) References Cited

U.S. PATENT DOCUMENTS

| | | | | |
|---|---|---|---|---|
| 5,795,673 A | * | 8/1998 | Miyagawa | ............ H01M 10/54 429/49 |
| 2011/0281170 A1 | * | 11/2011 | Mitsuda | .................. H01M 4/13 29/25.03 |
| 2012/0237825 A1 | * | 9/2012 | Nakano | ............... H01M 4/0404 118/620 |
| 2013/0074711 A1 | | 3/2013 | Uematsu et al. | |

(Continued)

FOREIGN PATENT DOCUMENTS

| | | | |
|---|---|---|---|
| JP | 2004073944 | * | 3/2004 |
| JP | 2008152946 | * | 7/2008 |

(Continued)

*Primary Examiner* — Brian K Talbot
(74) *Attorney, Agent, or Firm* — Dickinson Wright, PLLC

(57) ABSTRACT

This manufacturing method is a method of manufacturing a compressed strip-shaped electrode plate. The method includes: a preliminary compression step of forming a pre-compressed strip-shaped electrode plate by roll-pressing an uncompressed strip-shaped electrode plate in which an uncompressed active material layer that is not yet compressed is formed on a current collector foil; an attraction and removal step of attracting and removing fine particles of active material particles from near a surface of a pre-compressed active material layer by an attracting magnet that is disposed so as to be separated from the pre-compressed active material layer in a thickness direction; and a main compression step of obtaining the compressed strip-shaped electrode plate by roll-pressing a particle-removed strip-shaped electrode plate from which the fine particles have been removed.

4 Claims, 5 Drawing Sheets

(56) References Cited

U.S. PATENT DOCUMENTS

2016/0111729 A1* 4/2016 Kim .................... H01M 4/1391
                                                    429/235
2020/0280049 A1* 9/2020 Liu ..................... H01M 4/1393

FOREIGN PATENT DOCUMENTS

| JP | 2008152946 A | 7/2008 |
| JP | 2013073690 A | 4/2013 |
| JP | 2015090805 A | 5/2015 |
| JP | 2015179602 A | 10/2015 |

* cited by examiner

MANUFACTURING METHOD OF COMPRESSED STRIP-SHAPED ELECTRODE PLATE

CROSS-REFERENCE TO RELATED APPLICATION

This application claims priority to Japanese Patent Application No. 2020-077409 filed on Apr. 24, 2020, incorporated herein by reference in its entirety.

BACKGROUND

1. Technical Field

The present disclosure relates to a manufacturing method of a compressed strip-shaped electrode plate and a manufacturing system of a compressed strip-shaped electrode plate.

2. Description of Related Art

In manufacturing of a strip-shaped electrode plate including a strip-shaped current collector foil and a strip-shaped active material layer that contains active material particles and a binding agent and extends in a longitudinal direction, it is a conventionally known practice to increase the density of the active material layer by roll-pressing, and thereby compressing in a thickness direction, a strip-shaped (uncompressed) electrode plate that is formed by, for example, applying and then drying an active material paste (e.g., see Japanese Unexamined Patent Application Publication No. 2013-73690 and Japanese Unexamined Patent Application Publication No. 2015-90805).

SUMMARY

When the active material layer of a long strip-shaped electrode plate is compressed in the thickness direction by roll-pressing, sometimes fine particles of the active material particles stick little by little to a part of a surface of the press roll that presses the active material layer, and the thickness and area of sticking increase gradually over time. If fine particles of the active material particles thus stick to the press roll, the active material layer cannot be appropriately densified due to, for example, a dent formed in the roll-pressed active material layer at a position corresponding to the position of sticking. Thus, it is difficult to manufacture a compressed strip-shaped electrode plate having an evenly densified compressed active material layer.

It has been learned that fine particles of active material particles sticking to the surface of a press roll include broken-off fine particles that are fragments of active material particles having broken off from the active material particles, and small-diameter fine particles that are those active material particles that have extremely small particle diameters, and that these fine particles adhere to the surface of the press roll through the binding agent. When an active material layer is compressed by a press roll, the active material layer is subjected to not only a compressive force but also a shearing force from the press roll. As active material particles present near the surface of the active material layer are subjected to the compressive force or the shearing force, fragments of the active material particles may break off and turn into broken-off fine particles. Meanwhile, active material particles used for an active material layer range in particle diameter from small to large, and include also active material particles that have extremely small particle diameters of 2 μm or less (small-diameter fine particles). When the surface of the press roll comes into pressure-contact with the surface of the active material layer, some of the broken-off fine particles and the small-diameter fine particles present near the surface of the active material layer adhere to the surface of the press roll through the binding agent that adheres to these particles. Sticking of fine particles of active material particles to the surface of the press roll as described above seems to be caused by such broken-off fine particles and small-diameter fine particles repeatedly adhering to the surface of the press roll during the process of densification of a strip-shaped electrode plate using the press roll.

The present disclosure has been made in view of such a problem and provides a manufacturing method of a compressed strip-shaped electrode plate and a manufacturing system of a compressed strip-shaped electrode plate in which fine particles of active material particles are less likely to stick to the surfaces of press rolls when a strip-shaped electrode plate is compressed by roll-pressing, and by which a compressed strip-shaped electrode plate having an evenly densified compressed active material layer can be manufactured.

A first aspect of the present disclosure to solve the above problem is a manufacturing method of a compressed strip-shaped electrode plate including: a strip-shaped current collector foil; and a compressed active material layer that contains active material particles that are attracted to a magnet, and a binding agent, and is formed on the current collector foil and compressed in a thickness direction of the current collector foil. This manufacturing method includes: a preliminary compression step of forming a pre-compressed strip-shaped electrode plate by roll-pressing, using first press rolls, an uncompressed strip-shaped electrode plate in which an uncompressed active material layer that is not yet compressed is formed on the current collector foil; an attraction and removal step of attracting and removing fine particles of the active material particles from near a surface of a pre-compressed active material layer of the pre-compressed strip-shaped electrode plate by an attracting magnet that is disposed so as to be separated from the pre-compressed active material layer in the thickness direction; and a main compression step of obtaining the compressed strip-shaped electrode plate by roll-pressing, using second press rolls, a particle-removed strip-shaped electrode plate from which the fine particles have been removed in the attraction and removal step.

This manufacturing method includes, before the main compression step, the preliminary compression step of forming the pre-compressed active material layer by roll-pressing the uncompressed active material layer using the first press rolls, and the attraction and removal step. Generally, near a surface of the uncompressed active material layer, active material particles are present from which, if the main compression step is directly performed, fragments easily break off and turn into broken-off fine particles under a compressive force or a shearing force exerted by the second press rolls. In the technique of the present disclosure, preliminary compression using the first press rolls is performed in the preliminary compression step to generate broken-off fine particles from such active material particles beforehand. Then, in the attraction and removal step, the broken-off fine particles that have been generated beforehand in the preliminary compression step and small-diameter fine particles that are those active material particles that have extremely small particle diameters are attracted and removed from near the surface of the pre-compressed active material layer by using the attracting magnet. As a result, the likelihood that fine particles of active material particles may stick to the second press rolls as in conventional methods can be reduced in the main compression step, so that a compressed strip-shaped electrode plate having an evenly densified compressed active material layer can be manufactured.

The term "compressed strip-shaped electrode plate" to be manufactured covers an electrode plate having a compressed active material layer provided on one surface of the current collector foil, as well as an electrode plate having a compressed active material layer provided on each surface of the current collector foil. The same applies to the terms "uncompressed strip-shaped electrode plate," "pre-compressed strip-shaped electrode plate," and "particle-removed strip-shaped electrode plate." The term "compressed active material layer" formed on the current collector foil covers not only a strip-shaped compressed active material layer that extends in the longitudinal direction of the current collector foil but also, for example, a rectangular compressed active material layer that is intermittently formed in the longitudinal direction. The same applies to the terms "uncompressed active material layer," "pre-compressed active material layer," and "particle-removed active material layer."

The active material particles contained in the active material layer are active material particles that are attracted to a magnet. Examples of the active material particles include positive-electrode active material particles that are attracted to a magnet because they are made of metal oxides including ferromagnetic Ni, Co, or Fe ions, such as $LiCoO_2$, $Li(Ni_{1/3}Co_{1/3}Mn_{1/3})O_2$, or $LiFePO_4$. The term "fine particles" of active material particles covers "broken-off fine particles" with particle diameters of 2 μm or less that are fragments of active material particles having broken off under a compressive force or a shearing force, and "small-diameter fine particles" that are those of active material particles that have particle sizes of 2 μm or less.

As the form of the "attracting magnet," a round rod shape, a rectangular plate shape, etc. can be used. Specific examples of the "attracting magnet" include a cylindrical magnet in which fan-shaped magnets each having an N-pole and an S-pole formed respectively in one end surface and the other end surface in a circumferential direction are forcedly disposed in a circle and fixed to one another, with the N-poles butted together and the S-poles butted together, such that the magnetic poles of the N-pole and the S-pole appear alternately in a circumferential direction in an outer circumferential surface. Further, as the "attracting magnet," a columnar, cylindrical, or prism-shaped (rectangular plate-shaped) magnet can also be used in which disc-shaped, ring-shaped, or rectangular plate-shaped magnets each having an N-pole and an S-pole formed respectively in one surface and the other surface in a thickness direction are forcibly stacked and fixed to one another in the thickness direction, with the N-poles butted together and the S-poles butted together, such that the magnetic poles of the N-pole and the S-pole appear alternately in a stacking direction (the thickness direction; an axial direction) in an outer side surface. In addition, as the "attracting magnet," a magnet that is obtained by covering a surface of the aforementioned magnets on the side of a pre-compressed strip-shaped electrode plate with a member made of paramagnetic metal, plastic, or the like can also be used; for example, a magnet obtained by housing the aforementioned cylindrical, columnar, or prism-shaped magnet in a tube, such as a cylinder or a rectangular cylinder, made of paramagnetic metal (paramagnetic stainless steel (e.g., SUS304), copper, or the like that is not attracted to a magnet), plastic, such as PET or acryl, ceramic, such as alumina, or the like, and a magnet obtained by housing the aforementioned magnets in a tube, such as a cylinder with a bottom or a rectangular cylinder, made of paramagnetic metal, plastic, or the like.

The separation distance between the attracting magnet and the pre-compressed active material layer of the pre-compressed strip-shaped electrode plate is set to such a distance that the attracting magnet can appropriately attract fine particles of the active material particles from the surface of the pre-compressed active material layer. The separation distance can be adjusted as necessary according to the strength of the magnetic force of the attracting magnet (specifically, the degree of a magnetic flux density in a surface of the attracting magnet). The separation distance can be adjusted to be longer when the strength of the magnetic force of the attracting magnet is higher and to be shorter when the strength of the magnetic force is lower.

The preliminary compression step, the attraction and removal step, and the main compression step can be performed separately in terms of time or process by, for example, including, between steps, a reeling step of reeling up a strip-shaped electrode plate in each stage onto a roll. However, it is also possible to manufacture a compressed strip-shaped electrode plate by performing the preliminary compression step, the attraction and removal step, and the main compression step in this order as a series of steps on an uncompressed strip-shaped electrode plate that is being transferred in the longitudinal direction.

Further, in the manufacturing method of a compressed strip-shaped electrode plate, the preliminary compression step may use, as the first press rolls, magnet rolls with magnetic fields generated in surfaces of the magnet rolls.

In this manufacturing method, the preliminary compression step is performed by using magnet rolls as the first press rolls. Thus, in preliminary compression of the uncompressed active material layers in the preliminary compression step, broken-off fine particles generated on the surfaces of the pre-compressed active material layers and small-diameter fine particles present near the surfaces can be magnetized by the magnetic fields, which helps attract and remove these fine particles by the attracting magnet in the attraction and removal step.

Examples of the magnet rolls used as the first press rolls include magnet rolls obtained by integrating a cylindrical or columnar magnet with magnetic poles formed in an outer surface into an outer cylinder that is made of paramagnetic metal, such as stainless steel (e.g., SUS304).

Further, in one of the above-described manufacturing methods of a compressed strip-shaped electrode plate, the preliminary compression step may use the first press rolls that have a smaller diameter than the second press rolls.

In roll-pressing, a larger shearing stress is applied to an object being rolled when the press rolls have a smaller diameter D. In this manufacturing method, the first press rolls have a smaller diameter than the second press rolls. In the preliminary compression step, a larger shearing force can be applied to the uncompressed active material layer by using the first press rolls that have a smaller diameter than the second press rolls than by using the first press rolls that have the same diameter as the second press rolls or a larger diameter than the second press rolls. Thus, active material particles which are present near the surface of the uncompressed active material layer and from which fragments may break off when a compressive force or a shearing force is applied can be subjected to a large shearing force in the preliminary compression step to thereby cause fragments of the active material particles to break off and turn into broken-off fine particles beforehand, so as to be removed in the attraction and removal step. This can further reduce the likelihood that broken-off fine particles may be generated from active material particles and stick to the second press rolls in the main compression step.

Further, in one of the above-described manufacturing methods of a compressed strip-shaped electrode plate, a preliminary load that is applied to the uncompressed active material layer using the first press rolls in the preliminary compression step may be set to be smaller than a main load that is applied to the particle-removed active material layer using the second press rolls in the main compression step.

In this manufacturing method, the preliminary load is set to be smaller than the main load, which can reduce the likelihood that broken-off fine particles generated in the preliminary compression step and small-diameter fine particles contained in the uncompressed active material layers near the surfaces thereof may stick to the first press rolls by coming into strong pressure-contact with the first press rolls through the binding agents.

Further, in one of the above-described manufacturing methods of a compressed strip-shaped electrode plate, the preliminary compression step, the attraction and removal step, and the main compression step may be performed in this order on the uncompressed strip-shaped electrode plate that is being transferred in a longitudinal direction of the current collector foil.

In this manufacturing method, the steps are sequentially performed as a series of steps on the uncompressed strip-shaped electrode plate, so that the compressed strip-shaped electrode plate can be easily obtained.

Another aspect of the present disclosure to solve the above problem is a manufacturing system of a compressed strip-shaped electrode plate including: a strip-shaped current collector foil; and a compressed active material layer that contains active material particles that are attracted to a magnet, and a binding agent, and is formed on the current collector foil and compressed in a thickness direction of the current collector foil. This manufacturing system includes: a preliminary compression unit that has a first roll press machine using first press rolls and, by the first roll press machine, compresses, in the thickness direction, an uncompressed strip-shaped electrode plate in which an uncompressed active material layer that is not yet compressed is formed on the current collector foil; an attraction and removal unit that has an attracting magnet disposed so as to be separated in the thickness direction from a pre-compressed active material layer of a pre-compressed strip-shaped electrode plate formed in the preliminary compression unit, and that attracts and removes fine particles of the active material particles from near a surface of the pre-compressed active material layer; and a main compression unit that has a second roll press machine using second press rolls and, by the second roll press machine, compresses, in the thickness direction, a particle-removed strip-shaped electrode plate from which the fine particles have been removed by the attraction and removal unit.

This manufacturing system includes, other than the main compression unit, the preliminary compression unit and the attraction and removal unit. Before compression by the second roll press machine in the main compression unit, broken-off fine particles are generated by preliminary compression in the preliminary compression unit and the broken-off fine particles and small-diameter fine particles are attracted and removed in the attraction and removal unit. As a result, fine particles of the active material particles are less likely to stick to the second press rolls used in the second roll press machine of the main compression unit, so that a compressed strip-shaped electrode plate having an evenly densified compressed active material layer can be manufactured.

In the manufacturing system of a compressed strip-shaped electrode plate, the preliminary compression unit may use, as the first press rolls, magnet rolls with magnetic fields generated in surfaces of the magnet rolls.

In this manufacturing system, magnet rolls are used as the first press rolls. Thus, in preliminary compression of the uncompressed active material layer in the preliminary compression unit, broken-off fine particles generated on the surface of the pre-compressed active material layer and small-diameter fine particles present near the surface can be magnetized by the magnetic fields, which further helps attract and remove these fine particles by the attracting magnet in the attraction and removal unit.

Further, in one of the above-described manufacturing systems of a compressed strip-shaped electrode plate, the preliminary compression unit may use the first press rolls that have a smaller diameter than the second press rolls.

In this manufacturing system, the first press rolls (magnet rolls) have a smaller diameter than the second press rolls. In the preliminary compression unit, a larger shearing force can be applied to the uncompressed active material layers by using the first press rolls that have a smaller diameter than the second press rolls than by using the first press rolls that have the same diameter as the second press rolls or a larger diameter than the second press rolls. Thus, active material particles which are present near the surfaces of the uncompressed active material layers and from which fragments may break off when a compressive force or a shearing force is applied can be subjected to a large shearing force in the preliminary compression unit to thereby cause fragments of the active material particles to break off and turn into broken-off fine particles beforehand, so as to be removed in the attraction and removal unit. This can further reduce the likelihood that broken-off fine particles that are fragments having broken off from active material particles may stick to the second press rolls in the main compression unit.

Further, one of the above-described manufacturing systems of a compressed strip-shaped electrode plate may further include a transfer unit that transfers the uncompressed strip-shaped electrode plate in the longitudinal direction, and the preliminary compression unit, the attraction and removal unit, and the main compression unit may be disposed so as to perform processes in this order on the uncompressed strip-shaped electrode plate that is being transferred by the transfer unit.

In this manufacturing system, processes in the respective units are sequentially performed as a series of processes on the uncompressed strip-shaped electrode plate, so that a compressed strip-shaped electrode plate can be easily obtained.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
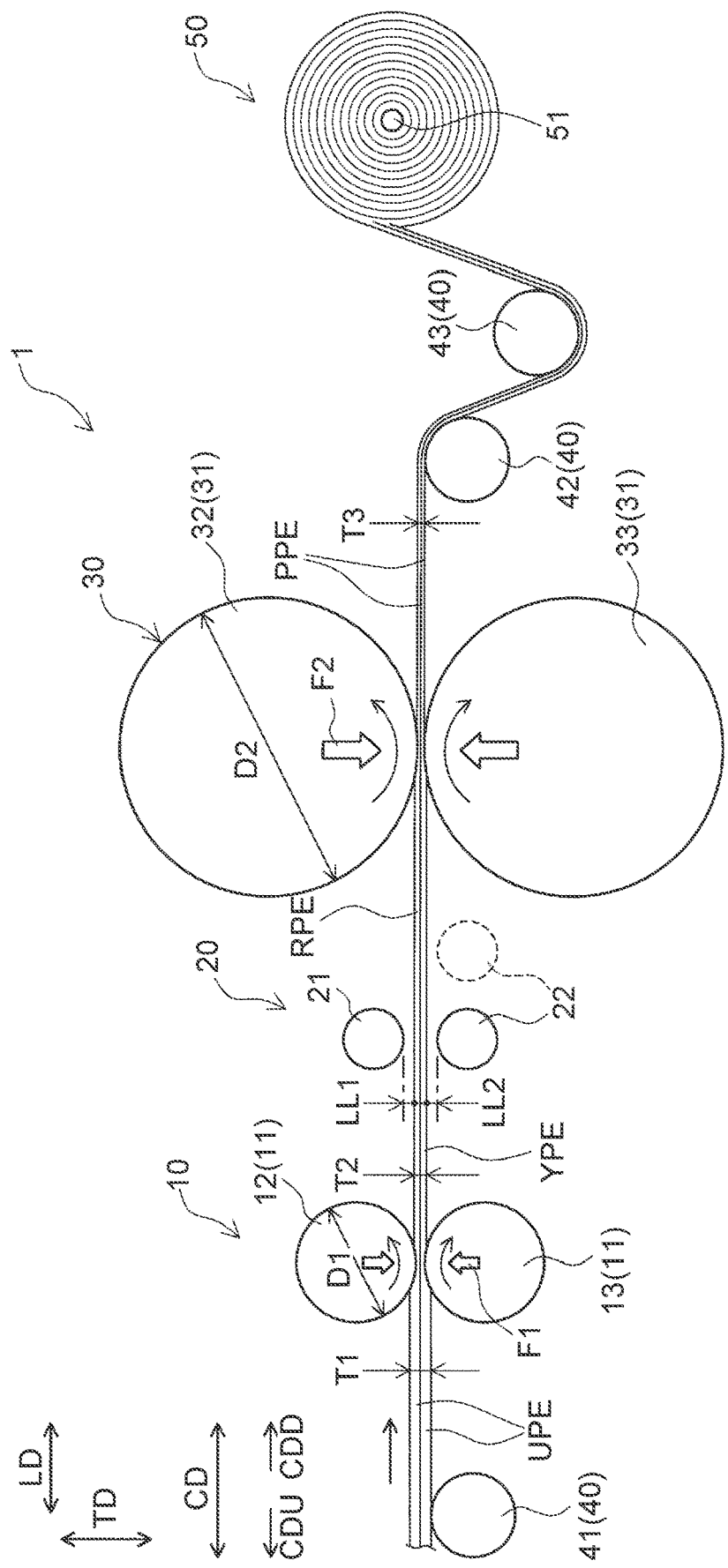
FIG. 1 is a view illustrating a manufacturing system of a compressed strip-shaped positive electrode plate according to an embodiment.

An embodiment of the present disclosure will be described below with reference to FIG. 1 to FIG. 5. A manufacturing system 1 (see FIG. 1) according to this embodiment is a manufacturing system that manufactures a compressed positive electrode plate PPE by compressing an uncompressed positive electrode plate UPE in a thickness direction TD of a current collector foil CF.

The uncompressed positive electrode plate UPE (see also FIG. 2) has the current collector foil CF that is made of aluminum and has a strip shape, and uncompressed active material layers UAM that are formed respectively on both surfaces of the current collector foil CF, at a central part in a width direction (a direction orthogonal to the sheet planes of FIG. 1 and FIG. 2), except for both end portions in the width direction, in a strip shape extending in a longitudinal direction LD of the current collector foil CF. The uncompressed active material layers UAM contain active material particles AM that are attracted to a magnet, and a binding agent BD. Specifically, the uncompressed active material layers UAM contain positive-electrode active material particles made of Li $(Ni_{1/3}Co_{1/3}Mn_{1/3})O_2$ as the active material particles AM, and also PVDF as the binding agent BD and acetylene black as a conduction promoting agent. (So do a pre-compressed active material layer YAM, a particle-removed active material layer RAM, and a compressed active material layer PAM, all to be described later.) The active material particles AM made of Li $(Ni_{1/3}Co_{1/3}Mn_{1/3})O_2$ are a metal oxide containing ferromagnetic Ni, Co, and Fe ions and has the property of being attracted to a magnet. The active material particles AM used for the uncompressed active material layer UAM etc. range in particle diameter from a small particle diameter to a large one, with a peak roughly at an average particle diameter. (The active material particles AM are represented by while circles with various diameters in FIG. 2 to FIG. 4). For example, the active material particles AM used in this embodiment have an average particle diameter of 10 μm and include active material particles AM roughly within a range of particle diameters of 1 μm to 15 μm. The active material particles AM include about 3 wt % of fine particles having particle diameters of 2 μm or less. (Hereinafter, such fine particles will be referred to as small-diameter fine particles AMD.)

The uncompressed positive electrode plate UPE is formed by, for example, applying an active material paste (not shown) containing a solvent, the active material particles AM, the binding agent BD, etc. to the central part of the current collector foil CF in the width direction and drying this active material paste. It is also possible to form the uncompressed positive electrode plate UPE by creating a mass of wet granular materials including a solvent, the active material particles AM, the binding agent BD, etc., forming an active material paste layer by transferring the mass onto a transfer roll while compressing the mass, further transferring the active material paste layer onto the current collector foil CF, and then drying the active material paste layer.

In this embodiment, an example is shown in which an uncompressed positive electrode plate that has the uncompressed active material layer UAM on each surface of the current collector foil CF is used as the uncompressed positive electrode plate UPE. However, an uncompressed positive electrode plate that has the uncompressed active material layer UAM on only one surface of the current collector foil CF, or an uncompressed positive electrode plate that has the compressed active material layer PAM that has been already compressed on one surface of the current collector foil CF and has the uncompressed active material layer UAM on only the other surface can also be used as the uncompressed positive electrode plate UPE.

Figure 2:
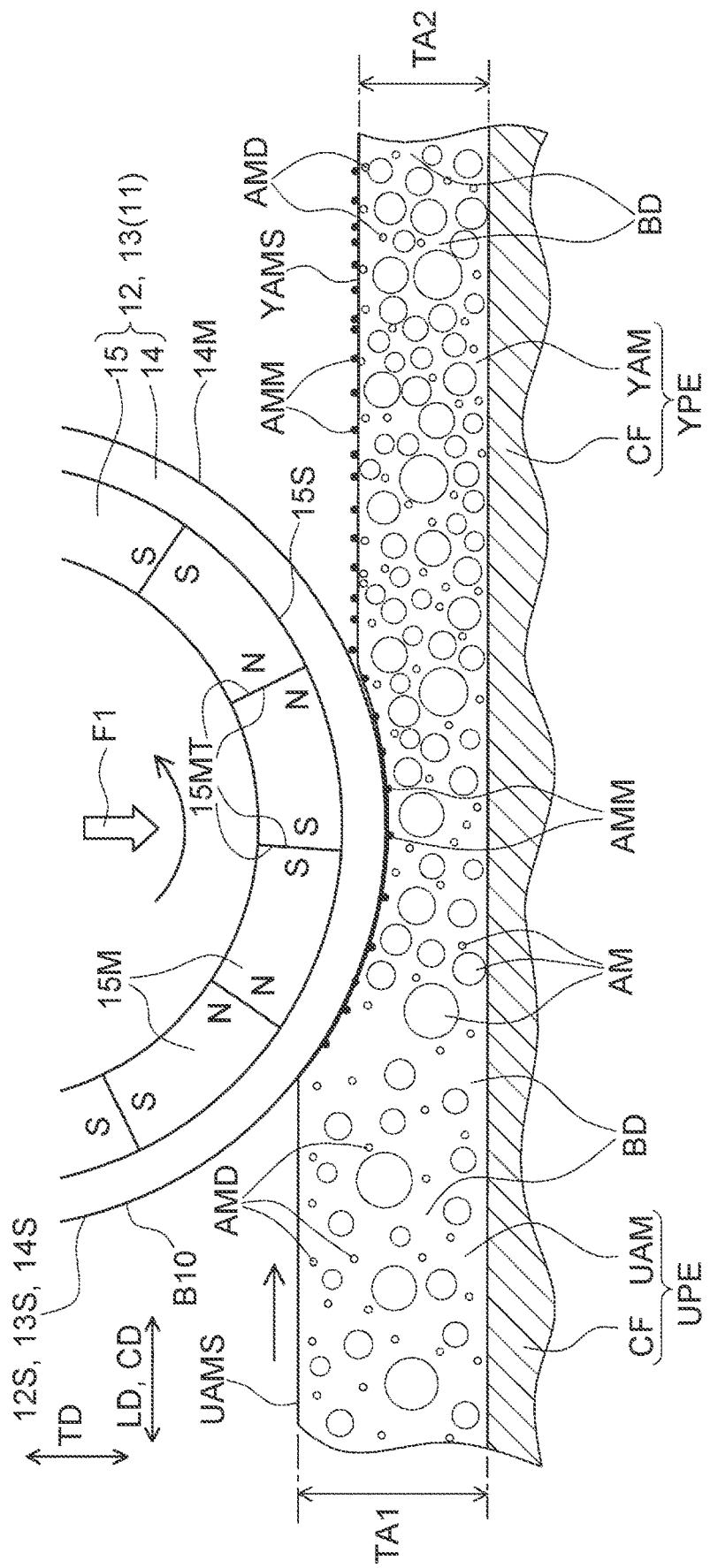
FIG. 2 is a view according to the embodiment, illustrating how an uncompressed strip-shaped electrode plate is roll-pressed by first press rolls to form a pre-compressed positive electrode plate in a preliminary compression unit.
Figure 3:
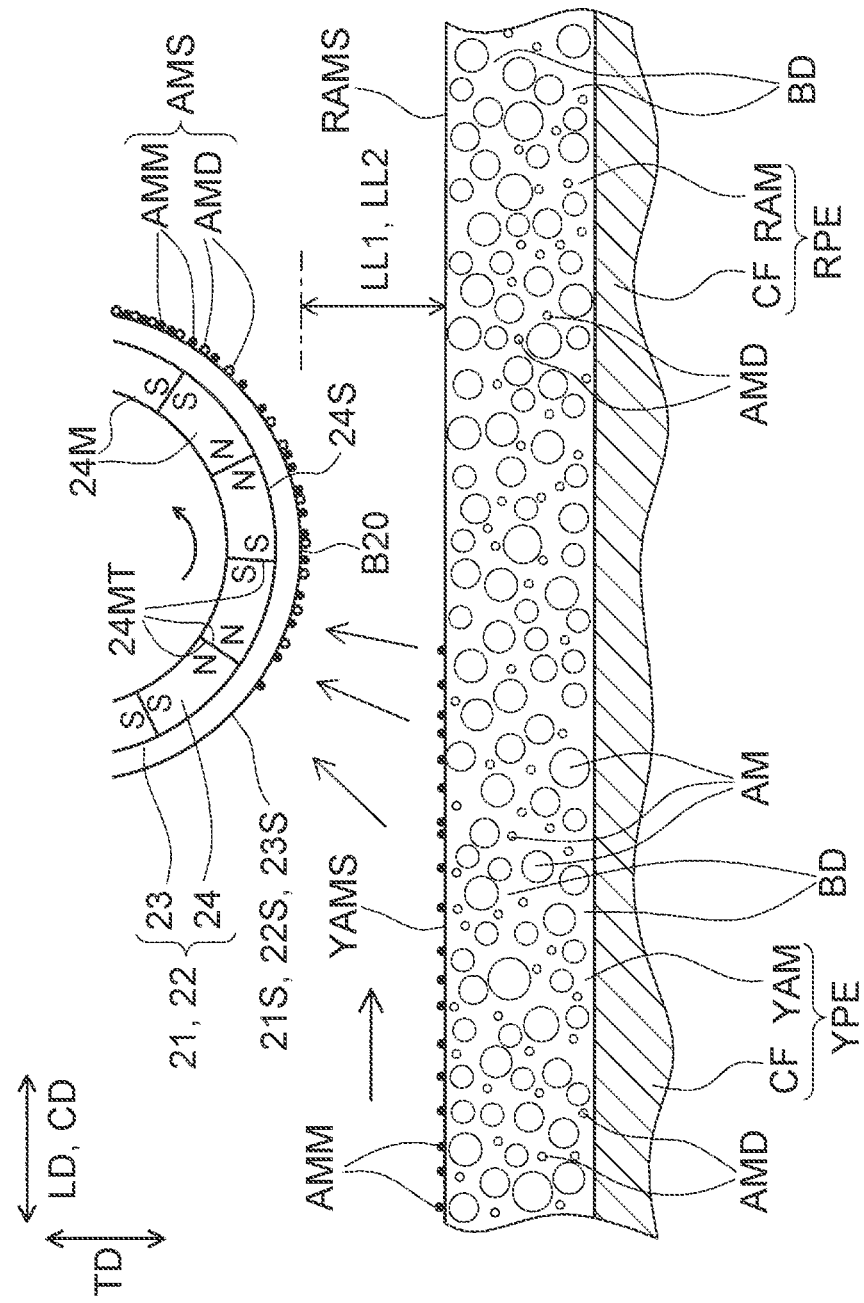
FIG. 3 is a view according to the embodiment, illustrating how fine particles of active material particles are attracted and removed from a surface of a pre-compressed active material layer by attracting magnets in an attraction and removal unit.
Figure 4:
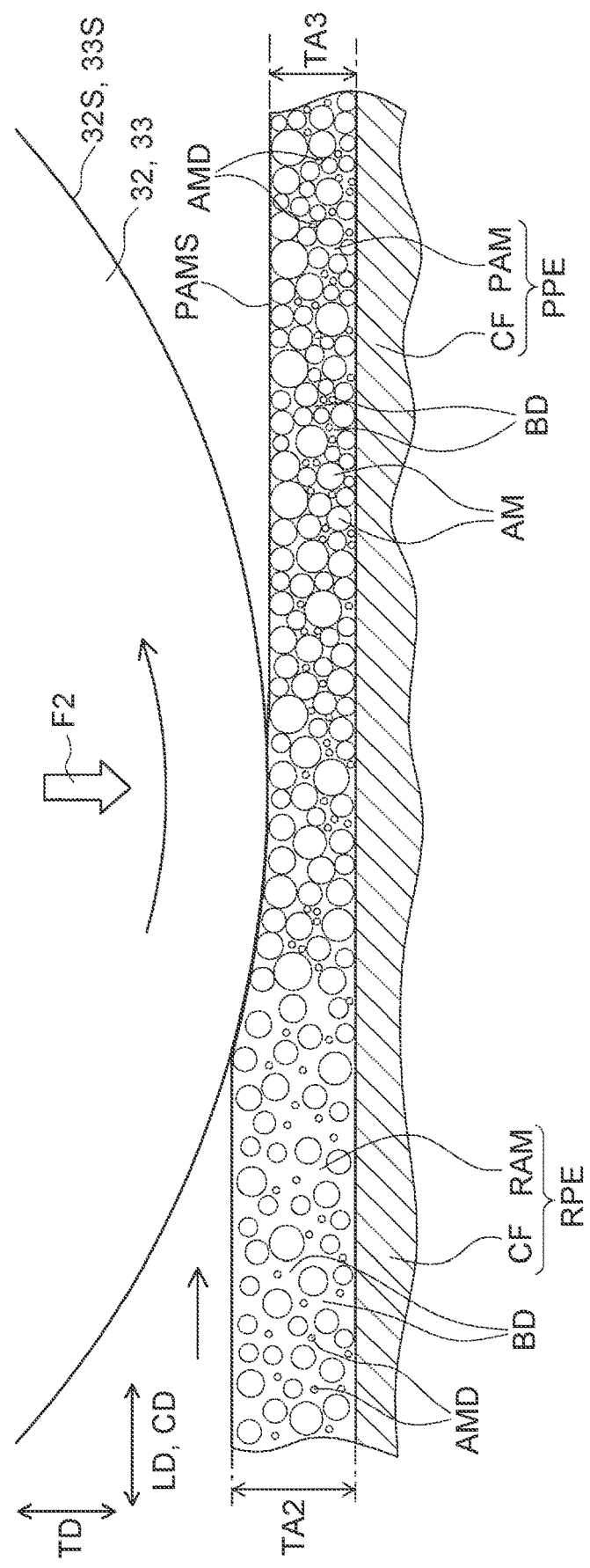
FIG. 4 is a view according to the embodiment, illustrating how a particle-removed positive electrode plate is roll-pressed by second press rolls to form a compressed strip-shaped electrode plate in a main compression unit.
Figure 5:
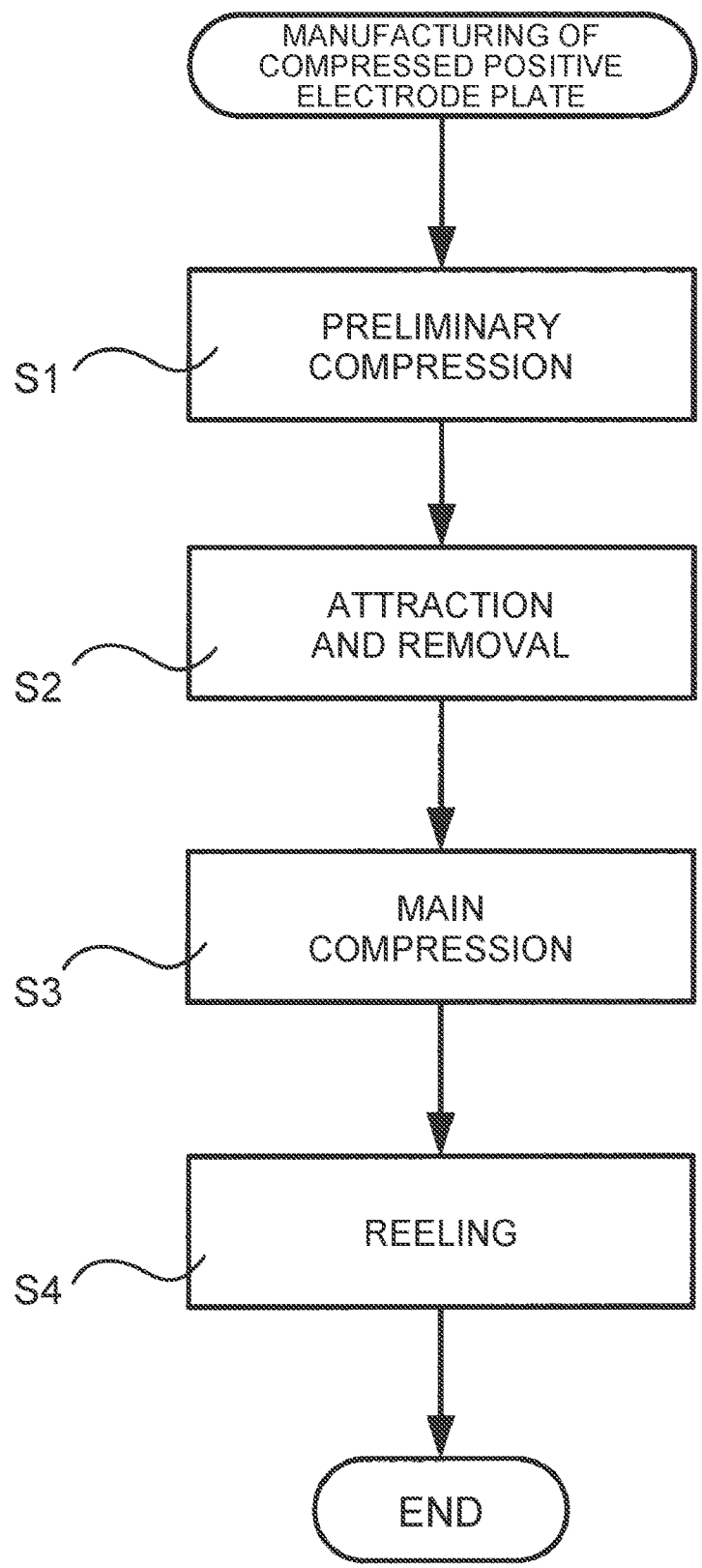
FIG. 5 is a flowchart of steps according to the embodiment.

The manufacturing system 1 of this embodiment is composed of a preliminary compression unit 10, an attraction and removal unit 20, a main compression unit 30, a transfer unit 40, and a reeling unit 50 (see also FIG. 2 to FIG. 4). Of these components, the transfer unit 40 has transfer rollers 41, 42, 43 and, as shown in FIG. 1, delivers an electrode plate in each stage, such as the uncompressed positive electrode plate UPE, to the reeling unit 50 by transferring the electrode plate in a longitudinal direction LD (transfer direction CD) using the transfer rollers 41, 42, 43. The manufacturing system 1 can implement a manufacturing method of the compressed positive electrode plate PPE in which a preliminary compression step S1, an attraction and removal step S2, a main compression step S3, and a reeling step S4 are performed in this order (see FIG. 5).

The preliminary compression unit 10 (see also FIG. 2) of the manufacturing system 1 forms a pre-compressed positive electrode plate YPE by compressing the strip-shaped uncompressed positive electrode plate UPE in the thickness direction TD while transferring the strip-shaped uncompressed positive electrode plate UPE using a transfer roller 2 etc. in the transfer direction CD that coincides with the longitudinal direction LD of the current collector foil CF. Specifically, the preliminary compression unit 10 has a first roll press machine 11 that uses a pair of first press rolls 12, 13 and, by the first roll press machine 11, compresses, in the thickness direction TD, the uncompressed positive electrode plate UPE which has a strip shape extending in the longitudinal direction LD and in which the uncompressed active material layers UAM that are not yet compressed in the thickness direction TD are formed. Thus, the preliminary compression step S1 of forming the pre-compressed positive electrode plate YPE by roll-pressing the uncompressed positive electrode plate UPE using the first press rolls 12, 13 is performed in the preliminary compression unit 10.

As a result of this preliminary compression, the uncompressed positive electrode plate UPE having a thickness T1 turns into the pre-compressed positive electrode plate YPE having a thickness T2 smaller than the thickness T1 (T2<T1), and the uncompressed active material layer UAM having a thickness TA1 turns into the pre-compressed active material layer YAM having a thickness TA2 smaller than the thickness TA1 (TA2<TA1).

When the uncompressed positive electrode plate UPE is roll-pressed by the pair of first press rolls 12, 13 in the preliminary compression step S1 that is performed using the preliminary compression unit 10, a compressive force and a shearing force are applied to the uncompressed active material layers UAM of the uncompressed positive electrode plate UPE. In particular, a large shearing force tends to be applied from the first press rolls 12, 13 to those of the active material particles AM contained in each uncompressed active material layer UAM (represented by white circles in FIG. 2 to FIG. 4) that are located near a surface UAMS of the uncompressed active material layer UAM. Then, fragments break off from the active material particles AM and thus broken-off fine particles AMM (represented by small black circles in FIG. 2 and FIG. 3) that have small sizes (particle diameters of 2 μm or less) are generated. Since the broken-off fine particles AMM are also bonded to other active material particles AM etc. in the pre-compressed active material layers YAM through the binding agents BD, the broken-off fine particles AMM remain on surfaces YAMS of the pre-compressed active material layers YAM without moving to outer circumferential surfaces 12S, 13S of the first press rolls 12, 13.

Further, in this embodiment, as shown in FIG. 2, magnet rolls with magnetic fields generated in the outer circumferential surfaces 12S, 13S are used as the pair of first press rolls 12, 13 used in the first roll press machine 11. Specifically, the first press rolls 12, 13 are formed by inserting and fixing, and thereby integrating, a magnet core 15 inside a cylindrical outer cylinder 14 made of paramagnetic stainless steel (SUS304). The magnet core 15 is composed of an even number of fan-shaped magnets 15M that have a fan-shaped cross-section and are elongated in an axial direction of the first press rolls 12, 13 (the width direction of the current collector foil CF; a direction perpendicular to the sheet plane of FIG. 2) and that are magnetized such that each magnet 15M has an N-pole and an S-pole formed respectively in end surfaces 15MT in a circumferential direction. These magnets 15M are combined into a cylindrical shape and fixed to one another, with the N-poles butted together and the S-poles butted together, so as to form a pattern in which the magnetic poles of the N-pole and the S-pole appear alternately in a circumferential direction in an outer circumferential surface 15S of the magnet core 15. Thus, the magnetic poles of the N-pole and the S-pole also appear alternately in a circumferential direction in an outer circumferential surface 14S of the outer cylinder 14, i.e., the outer circumferential surfaces 12S, 13S of the first press rolls 12, 13.

A magnetic flux density B10 at the magnetic poles formed in the outer circumferential surfaces 12S, 13S of the first press rolls 12, 13 is set to be, for example, lower than 0.1 T (=1000 G), specifically, 0.08 T, which is not higher than a tenth of a magnetic flux density in outer circumferential surfaces 21S, 22S of magnet bars 21, 22 used in the attraction and removal unit 20 to be described next.

Thus, in the preliminary compression unit 10 and the preliminary compression step S1 using the preliminary compression unit 10 of this embodiment, the first press rolls 12, 13 (magnet rolls) having the integrated magnet core (magnet) 15 are used. This makes it possible to form the pre-compressed positive electrode plate YPE that is preliminarily compressed and, at the same time, to magnetize the broken-off fine particles AMM generated on the surface YAMS of the pre-compressed active material layer YAM and the small-diameter fine particles AMD present near the surface YAMS by the magnetic fields generated in the first press rolls 12, 13, which helps attract and remove these fine particles by the magnet bars 21, 22 in the attraction and removal step S2 to be described next.

To prevent wear of the outer cylinder 14, a hard plating layer 14M formed by a hard chrome plating is formed on the outer circumferential surface 14S of the outer cylinder 14. Instead of thus providing the hard plating layer 14M on the outer circumferential surface 14S of the outer cylinder 14, a surface treatment for hardening the surface of the outer cylinder 14 according to the material may also be performed.

As can be easily understood from FIG. 1, FIG. 2, and FIG. 4, in the manufacturing system 1 of this embodiment, a diameter D1 of the pair of first press rolls 12, 13 used in the preliminary compression unit 10 is set to be smaller than a diameter D2 of a pair of second press rolls 32, 33 used in the main compression unit 30 to be described later (D1<D2). Specifically, the diameter D1 is set to be about 1/2.5 of the diameter D2 (D1=D2/2.5).

Generally, in roll-pressing, a larger shearing stress is applied to an object being rolled when the press rolls have a smaller diameter D. In the manufacturing system 1, the diameter D1 of the first press rolls 12, 13 is set to be smaller than the diameter D2 of the second press rolls 32, 33 (D1<D2). In the preliminary compression step S1 using the preliminary compression unit 10, a larger shearing force can be applied to the uncompressed active material layers UAM by using the first press rolls 12, 13 that have a smaller diameter than the second press rolls (D1<D2) as in this embodiment than by using the first press rolls that have the same diameter as the second press rolls (D1=D2) or a larger diameter than the second press rolls (D1>D2).

Thus, the active material particles AM which are present near the surfaces UAMS of the uncompressed active material layers UAM and from which fragments may break off can be subjected to a large shearing force in the preliminary compression unit 10 to thereby cause fragments to break off and turn into the broken-off fine particles AMM beforehand, so as to be removed by the magnet bars 21, 22 of the attraction and removal unit 20. This can further reduce the likelihood that the broken-off fine particles AMM may be generated from the active material particles AM and stick to the second press rolls 32, 33 in the main compression unit 30.

The diameter D1 is preferably within a range of ¼ to ¾ of the diameter D2. When the diameter D1 is smaller than ¼ of the diameter D2, the diameter D1 of the first press rolls 12, 13 is relatively so small that a large shearing force is applied to the uncompressed active material layers UAM and the active material particles break easily, which may result in excessive generation of broken-off fine particles AMM. On the other hand, when the diameter D1 is larger than ¾ of the diameter D2, the diameter D1 of the first press rolls 12, 13 is relatively large, so that a small shearing force is applied to the uncompressed active material layers UAM, which makes it difficult to appropriately generate the broken-off fine particles AMM and may result in an increased amount of fine particles AMS sticking to the second press rolls 32, 33 in the main compression step S3.

In the preliminary compression step S1 of this embodiment, a preliminary load F1 that is applied to compress the uncompressed active material layers UAM using the first press rolls 12, 13 in the preliminary compression step S1 is set to be smaller than a main load F2 that is applied to the particle-removed active material layers RAM using the second press rolls 32, 33 in the main compression step S3 to be described later (F1<F2). Specifically, in this embodiment, the preliminary load F1 is set to $2.3 \times 10^5$ N/m, which is smaller than the main load F2 (F2=$4.6 \times 10^5$ N/m).

A possible explanation for why the fine particles AMS, such as the broken-off fine particles AMM and the small-diameter fine particles AMD, move from the active material layers and stick to the press rolls is that, as the fine particles AMS come into strong pressure-contact with the press rolls through the binding agents BD, the strength with which the fine particles AMS adhere to the press rolls becomes larger than the strength with which the fine particles AMS adhere to other active material particles AM inside the active material layers. Based on this, the preliminary load F1 is set to be smaller than the main load F2 (F1<F2) in the manufacturing method of this embodiment. Thus, the fine particles AMS, such as the broken-off fine particles AMM generated in the preliminary compression step S1 and the small-diameter fine particles AMD contained in the uncompressed active material layers UAM near the surfaces UAMS, are less likely to come into strong pressure-contact with the first press rolls 12, 13 through the binding agents BD. As a result, the likelihood that the fine particles AMS may move from the uncompressed active material layers UAM to the first press rolls 12, 13 and stick to the first press rolls 12, 13 can be reduced.

The preliminary load F1 is preferably within a range of ¼ to ⅔ of the main load F2. When the load F1 is smaller than ¼ of the load F2, the load F1 applied to the first press rolls 12, 13 is so small that not only is a small amount of broken-off fine particles AMM generated in the preliminary compression step S1 but also it is unavoidable to increase the load F2 applied in the main compression step S3 to obtain the compressed positive electrode plate PPE having a desired thickness T3. Then, even when the fine particles AMS are removed in the attraction and removal step S2, the broken-off fine particles AMM are generated in the main compression step S3. Therefore, although sticking of fine particles to the press rolls is mitigated compared with that in conventional methods, the broken-off fine particles AMM are more likely to stick to the second press rolls 32, 33. On the other hand, when the load F1 is smaller than ⅔ of the load F2, the load F1 applied to the first press rolls 12, 13 is so large that, in the preliminary compression step S1, many active material particles AM break and an excessively large amount of broken-off fine particles AMM is generated, which makes the trouble of the broken-off fine particles AMM sticking to the first press rolls 12, 13 more likely.

Next, the attraction and removal unit 20 (see FIG. 1 and FIG. 3) of the manufacturing system 1 performs the attraction and removal step S2 of forming a particle-removed positive electrode plate RPE by attracting and removing the fine particles AMS of the active material particles AM from near the surfaces YAMS of the pre-compressed active material layers YAM of the strip-shaped pre-compressed positive electrode plate YPE, formed in the preliminary compression unit 10 (preliminary compression step S1), by the round-rod-shaped magnet bars 21, 22 while transferring the pre-compressed positive electrode plate YPE in the longitudinal direction LD (transfer direction CD).

The magnet bars 21, 22 used in the attraction and removal unit 20 have a magnetic force that is stronger than the magnetic force generated in the first press rolls 12, 13 that are magnet rolls, and are disposed so as to be separated from the pre-compressed active material layers YAM by separation distances LL1, LL2, respectively. In this embodiment, the strength of the magnetic force of the magnet bars 21, 22 (a magnetic flux density B20 in the outer circumferential surfaces 21S, 22S of the magnet bars 21, 22) and the separation distances LL1, LL2 are selected within such ranges that the broken-off fine particles AMM on the surfaces YAMS of the pre-compressed active material layers YAM can be attracted and that the small-diameter fine particles AMD among the active material particles AM present near the surfaces YAMS of the pre-compressed active material layers YAM can be attracted. (In this embodiment, LL1=LL2). Specifically, in this embodiment, the magnet bars 21, 22 having a magnetic flux density B20 of, for example, 1 T to 1.8 T (10000 G to 18000 G) are used, and the separation distances LL1, LL2 are selected within a range of about 2 mm to 8 mm.

Thus, in the attraction and removal unit 20, when the pre-compressed positive electrode plate YPE is transferred in the longitudinal direction LD, the broken-off fine particles AMM (having the property of being attracted to a magnet) that are formed in the preliminary compression unit 10 and present on the surfaces YAMS of the pre-compressed active material layers YAM are attracted by the magnetic forces of the magnet bars 21, 22 and move to the magnet bars 21, 22 by flying across the space. As a result, the broken-off fine particles AMM are removed from the surfaces YAMS of the pre-compressed active material layers YAM.

In addition, some of the small-diameter fine particles AMD of the active material particles AM (having the property of being attracted to a magnet) that are present near the surfaces YAMS of the pre-compressed active material layers YAM are also attracted by the magnetic forces of the magnet bars 21, 22 and move to the magnet bars 21, 22 by flying across the space. As a result, some of the small-diameter fine particles AMD are also removed from near the surfaces YAMS of the pre-compressed active material layers YAM. Among the active material particles AM, the small-diameter fine particles AMD having small particle diameters have also small surface areas, and some of the small-diameter fine particles AMD are bonded to other active material particles AM in the pre-compressed active material layers YAM through the binding agents BD with a small force. Therefore, when attracted by the strong magnetic forces of the magnet bars 21, 22, some of the small-diameter fine particles AMD move from near the surfaces YAMS of the pre-compressed active material layers YAM to the magnet bars 21, 22 by flying across the space. In this way, the fine particles AMS of the active material particles AM are attracted and removed from near the surfaces YAMS of the pre-compressed active material layers YAM to form the particle-removed positive-electrode plate having the particle-removed active material layers RAM. As shown in FIG. 3 and FIG. 4, inside each particle-removed active material layer RAM on an inner side from the vicinity of the surface RAMS (on the side of the current collector foil CF), the small-diameter fine particles AMD remain without being removed.

As shown in FIG. 3, as the magnet bars 21, 22 of this embodiment, round-rod-shaped magnets (attracting magnets) with magnetic fields generated in the outer circumferential surfaces 21S, 22S are used, and these magnets are used by being rotated in a forward direction indicated by the arrow in FIG. 3. Specifically, the magnet bars 21, 22 of this embodiment are formed by inserting a magnet core 24 into a cylindrical outer cylinder 23 that is made of paramagnetic stainless steel (SUS304). The magnet core 24 is composed of an even number of fan-shaped magnets 24M that have a fan-shaped cross-section and are elongated in an axial direction of the magnet bars 21, 22 (the width direction of the current collector foil CF; a direction perpendicular to the sheet plane of FIG. 3) and that each have magnetic poles of an N-pole and an S-pole formed respectively in end surfaces 24MT in a circumferential direction. These magnets 24M are combined into a cylindrical shape and fixed to one another such that the N-poles are butted together and the S-poles are butted together. Thus, the magnet core 24 is a magnet in which the magnetic poles of the N-pole and the S-pole appear alternately in a circumferential direction in an outer circumferential surface 24S. Therefore, the magnetic poles are formed also in an outer circumferential surface 23S of the outer cylinder 23, i.e., the outer circumferential surfaces 21S, 22S of the magnet bars 21, 22, in such a pattern that the N-pole and the S-pole appear alternately in a circumferential direction. The magnetic flux density B20 at the magnetic poles formed in the outer circumferential surfaces 21S, 22S of the magnet bars 21, 22 is set to be, for example, 1 T to 1.8 T, specifically, 1 T, which is not lower than ten times the magnetic flux density in the outer circumferential surfaces 12S, 13S of the first press rolls 12, 13 used in the preliminary compression unit 10.

Moreover, unlike the magnet cores 15 of the first press rolls 12, 13, the magnet cores 24 of the magnet bars 21, 22 can be inserted into and extracted from the outer cylinders 23. As described above, the fine particles AMS of the active material particles AM composed of the broken-off fine particles AMM and the small-diameter fine particles AMD are sucked up onto the outer circumferential surfaces 21S, 22S of the magnet bars 21, 22 by the magnetic force. As the fine particles AMS of the active material particles AM gradually build up on the outer circumferential surfaces 21S, 22S, it is necessary to remove the fine particles AMS of the active material particles AM from the outer circumferential surfaces 21S, 22S at an appropriate timing, such as after operation or during maintenance of the manufacturing system 1. While it is preferable that strong magnets be used as the magnet bars 21, 22, using strong magnets makes it conversely difficult to remove the fine particles AMS of the active material particles AM that have been sucked up onto the outer circumferential surfaces 21S, 22S. However, in the magnet bars 21, 22 of this embodiment, when the magnet cores 24 are extracted from the paramagnetic outer cylinders 23, the outer cylinders 23 lose their magnetic properties, so that the fine particles AMS of the active material particles AM can be easily removed from the outer circumferential surfaces 23S of the outer cylinders 23, i.e., from the outer circumferential surfaces 21S, 22S of the magnet bars 21, 22.

In the magnet bars 21, 22 of this embodiment, the outer cylinders 23 made of paramagnetic SUS304 are used and the magnet cores 24 are integrated inside the outer cylinders 23. Alternatively, the magnet cores 24 housed in cylinders made of other paramagnetic metal, such as copper, plastic cylinders, or ceramic cylinders can also be used.

The main compression unit 30 (see FIG. 1 and FIG. 4) of the manufacturing system 1 forms the compressed positive electrode plate PPE by compressing, in the thickness direction TD, the strip-shaped particle-removed positive electrode plate RPE that has already been preliminarily compressed, while transferring the particle-removed positive electrode plate RPE in the longitudinal direction LD (transfer direction CD). Specifically, the main compression unit 30 has a second roll press machine 31 that uses the pair of second press rolls 32, 33 and, by the second roll press machine 31, compresses, in the thickness direction, the particle-removed positive electrode plate RPE in which the strip-shaped particle-removed active material layers RAM extending in the longitudinal direction LD are formed on the current collector foil CF. Thus, the main compression step S3 of forming the compressed positive electrode plate PPE by roll-pressing the particle-removed positive electrode plate RPE using the second press rolls 32, 33 is performed in the main compression unit 30.

As a result of main compression, the particle-removed positive electrode plate RPE having the thickness T2 turns into the compressed positive electrode plate PPE having the thickness T3 smaller than the thickness T2 (T3<T2). As a result of main compression, the particle-removed active material layers RAM having the thickness TA2 turn into the compressed active material layers PAM having a thickness TA3 smaller than the thickness TA2 (TA3<TA2).

As in the preliminary compression step S1 in the preliminary compression unit 10, when the particle-removed positive electrode plate RPE is roll-pressed by the pair of second press rolls 32, 33 in the main compression step S3 in the main compression unit 30, a compressive force and a shearing force are applied also to the particle-removed active material layers RAM. However, of the active material particles AM (represented by white circles in FIG. 4) contained in the particle-removed active material layers RAM, those active material particles AM that are located near surfaces RAMS have already been subjected to a large shearing force from the first press rolls 12, 13 in the preliminary compression step S1. As a result, fragments of the active material particles AM that have tended to break when a shearing force or the like is applied have already broken off from the active material particles AM and turned into the broken-off fine particles AMM in the preliminary compression step S1, and thus these active material particles AM have become active material particles AM that do not easily break. Therefore, when a shearing force or the like is applied to the active material particles AM located near the surfaces RAMS of the particle-removed active material layers RAM in the main compression step S3, fragments of these active material particles AM are less likely to break off and turn into the broken-off fine particles AMM. In addition, some of the small-diameter fine particles AMD have also been removed from near the surfaces RAMS of the particle-removed active material layers RAM.

Thus, in the main compression step S3 in the main compression unit 30, the fine particles AMS of the active material particles AM such as the broken-off fine particles AMM and the small-diameter fine particles AMD are less likely to stick to the outer circumferential surfaces 32S, 33S of the pair of second press rolls 32, 33 through the binding agents BD. As a result, the compressed positive electrode plate PPE having the evenly densified compressed active material layers PAM can be manufactured.

The reeling unit 50 (see FIG. 1) of the manufacturing system 1 has a reeling roll 51 onto which the strip-shaped compressed positive electrode plate PPE that has been formed in the main compression unit 30 (main compression step S3) and transferred by the transfer rollers 42, 43 in the longitudinal direction LD (transfer direction CD) is reeled up, and performs the reeling step S4 of reeling up the compressed positive electrode plate PPE having been transferred via the transfer rollers 42, 43 onto the reeling roll 51.

This completes the compressed positive electrode plate PPE that has been reeled up onto the reeling roll 51 so as to be transportable.

In manufacturing of the compressed positive electrode plate PPE using the manufacturing system 1, the preliminary compression unit 10, the attraction and removal unit 20, and the main compression unit 30 are disposed so as to perform the processes in this order on the uncompressed positive electrode plate UPE that is being transferred by the transfer unit 40. Accordingly, the preliminary compression step S1, the attraction and removal step S2, and the main compression step S3 are performed in this order on the uncompressed positive electrode plate UPE that is being transferred in the longitudinal direction LD of the current collector foil CF.

Thus, in the manufacturing system 1, the processes in the respective units 10, 20, 30 are sequentially performed as a series of processes on the uncompressed positive electrode plate UPE, so that the compressed positive electrode plate PPE can be easily obtained. Moreover, since steps S1 to S3 are sequentially performed as a series of steps, the compressed positive electrode plate PPE can be easily obtained.

While the present disclosure has been described above based on the embodiment, the embodiment and examples disclosed herein are in every respect merely illustrative and not restrictive. The technical scope defined by the claims includes all changes that are equivalent in meaning and scope to the claims.

For example, in the example shown in the embodiment, the compressed positive electrode plate PPE (compressed strip-shaped electrode plate) is manufactured in which the strip-shaped compressed active material layer PAM extending in the longitudinal direction LD of the current collector foil CF is formed on each surface of the strip-shaped current collector foil CF (see FIG. 1). However, a compressed positive electrode plate (compressed strip-shaped electrode plate) may be manufactured in which a compressed active material layer having, for example, a rectangular shape, is intermittently formed in the longitudinal direction LD on one surface or both surfaces of the strip-shaped current collector foil CF.

In the example shown in the embodiment, the cylindrical magnet cores 24 formed by combining the fan-shaped magnets 24M and integrated inside the cylindrical outer cylinders 23 are used as the magnet bars 21, 22 (attracting magnets). Instead of the magnet bars 21, 22, the cylindrical magnet cores 24 can also be used as they are without using the outer cylinders 23. Further, instead of the magnet bars 21, 22, prism-shaped (rectangular plate-shaped) magnets with magnetic poles formed on a side facing the pre-compressed positive electrode plate YPE may be used as attracting magnets as they are or by being inserted into rectangular cylindrical outer cylinders made of a paramagnetic material.

In the example shown in the embodiment, the pair of magnet bars 21, 22 are disposed at opposite positions with the pre-compressed positive electrode plate YPE interposed therebetween as indicated by solid lines in FIG. 1. However, when the magnet bars 21, 22 are thus disposed, a large attracting force or repulsing force acts between the magnet bars 21, 22, which makes it necessary to provide a strong holding structure (not shown) for the magnet bars 21, 22. Therefore, the installation positions of the magnet bar 21 and the magnet bar 22 may be moved away from each other in the transfer direction CD so as to be separated from each other; for example, the magnet bar 22 may be disposed on a downstream side CDD in the transfer direction CD relatively to the magnet bar 21 as indicated by a dashed line in FIG. 1. Also in this case, as in the embodiment, the magnet bars 21, 22 are disposed at the separation distance LL1, LL2, respectively, from the surfaces YAMS of the pre-compressed active material layers YAM at which the magnet bars 21, 22 can appropriately attract and remove the fine particles AMS of the active material particles AM.

In the embodiment, the compressed positive electrode plate PPE in which the compressed active material layer PAM formed in a strip shape is formed on each surface of the strip-shaped current collector foil CF, at a central part in the width direction, except for both end portions in the width direction is formed in the main compression unit 30 (main compression step S3), and this compressed positive electrode plate PPE is directly reeled up onto the reeling roll 51. However, after the compressed positive electrode plate PPE is formed in the main compression unit 30, a slitting process of cutting the compressed positive electrode plate PPE in half at the center in the width direction may be performed to form two strips of strip-shaped positive electrode plates, and these positive electrode plates may be respectively reeled up onto reeling rolls.

What is claimed is:

1. A manufacturing method of a compressed strip-shaped electrode plate including:
   a strip-shaped current collector foil; and
   a compressed active material layer that contains active material particles that are attracted to a magnet, and a binding agent, and is formed on the current collector foil and compressed in a thickness direction of the current collector foil,
   the manufacturing method comprising:
   a drying step of drying an active material layer onto the current collector foil before a preliminary compression step;
   the preliminary compression step of forming a pre-compressed strip-shaped electrode plate by roll-pressing, using first press rolls, an uncompressed strip-shaped electrode plate in which an uncompressed active material layer that is not yet compressed is formed on the current collector foil;
   an attraction and removal step of attracting and removing fine particles of the active material particles from near a surface of a pre-compressed active material layer of the pre-compressed strip-shaped electrode plate by an attracting magnet that is disposed so as to be separated from the pre-compressed active material layer in the thickness direction; and
   a main compression step of obtaining the compressed strip-shaped electrode plate by roll-pressing, using second press rolls, a particle-removed strip-shaped electrode plate from which the fine particles have been removed in the attraction and removal step.

2. The manufacturing method of a compressed strip-shaped electrode plate according to claim 1, wherein the preliminary compression step uses, as the first press rolls, magnet rolls with magnetic fields generated in surfaces of the magnet rolls.

3. The manufacturing method of a compressed strip-shaped electrode plate according to claim 1, wherein the preliminary compression step uses the first press rolls that have a smaller diameter than the second press rolls.

4. The manufacturing method of a compressed strip-shaped electrode plate according to claim 1, wherein a preliminary load that is applied to the uncompressed active material layer using the first press rolls in the preliminary compression step is set to be smaller than a main load that is applied to the particle-removed active material layer using the second press rolls in the main compression step.

* * * * *